US010744793B2

(12) United States Patent
Pursel et al.

(10) Patent No.: US 10,744,793 B2
(45) Date of Patent: Aug. 18, 2020

(54) METHOD, SYSTEM, AND APPARATUS FOR PROVIDING PRODUCT DATA

(71) Applicant: Avery Dennison Corporation, Mentor, OH (US)

(72) Inventors: Lin Pursel, Bellbrook, OH (US); Jeffrey P. Jooste, Gig Harbor, WA (US); Kaan Tekinceer, Springboro, OH (US)

(73) Assignee: AVERY DENNISON CORPORATION, Glendale, CA (US)

( * ) Notice: Subject to any disclaimer, the term of this patent is extended or adjusted under 35 U.S.C. 154(b) by 77 days.

(21) Appl. No.: 14/478,605

(22) Filed: Sep. 5, 2014

(65) Prior Publication Data

US 2018/0065378 A1   Mar. 8, 2018

Related U.S. Application Data

(60) Provisional application No. 61/874,601, filed on Sep. 6, 2013.

(51) Int. Cl.
*B41J 3/407*   (2006.01)
*G06Q 30/02*   (2012.01)
(Continued)

(52) U.S. Cl.
CPC ............ *B41J 3/4075* (2013.01); *G06F 3/048* (2013.01); *G06K 7/1092* (2013.01);
(Continued)

(58) Field of Classification Search
USPC ................ 156/247, 249, 277, 384, 387, 538
See application file for complete search history.

(56) References Cited

U.S. PATENT DOCUMENTS 6,182,053 B1 *  1/2001  Rauber ............... G06Q 10/087
                                                235/375
7,681,790 B2 *  3/2010  Birmingham ....... G06Q 10/087
                                                235/383
(Continued)

FOREIGN PATENT DOCUMENTS

CN      102427469     7/2015
EP      0573751       12/1993
(Continued)

OTHER PUBLICATIONS

International Search Report and Written Opinion, ISA/US, prepared for PCT/US2014/054525 dated Sep. 5, 2015.
(Continued)

*Primary Examiner* — Sing P Chan
(74) *Attorney, Agent, or Firm* — Avery Dennison Retail Information Services, LLC

(57) ABSTRACT

An apparatus, application, and method for transmitting, receiving and providing data. One exemplary embodiment includes an apparatus with a handheld printer. The handheld printer may contain a base, a core, and a crown. The crown may contain a scanner and a printer. A further embodiment allows for a mobile device application may contain the date of the markdown, the description of the inventory, and a status of the markdown. The method may include an employee receiving information through communication with the handheld device, connecting the application with the handheld printer, and scanning the marked down item. The method may include a new tag that may be printed from the handheld printer.

20 Claims, 5 Drawing Sheets

(51) Int. Cl.
  *H04L 29/08* (2006.01)
  *G06K 7/10* (2006.01)
  *G06F 3/048* (2013.01)
(52) U.S. Cl.
  CPC ..... *G06Q 30/0207* (2013.01); *G06Q 30/0283* (2013.01); *H04L 67/125* (2013.01)

(56) References Cited

U.S. PATENT DOCUMENTS

| | | |
|---|---|---|
| 2002/0116267 A1 | 8/2002 | Weisz et al. |
| 2004/0032443 A1 | 2/2004 | Moylan et al. |
| 2006/0221363 A1 | 10/2006 | Roth et al. |
| 2008/0077459 A1 | 3/2008 | Desai et al. |
| 2010/0309503 A1 | 12/2010 | Partridge et al. |
| 2011/0058185 A1 | 3/2011 | Arihara |
| 2011/0205570 A1 | 8/2011 | Matsuda |
| 2012/0109765 A1* | 5/2012 | Araque ............. G06Q 30/0601 705/26.1 |
| 2013/0179307 A1 | 7/2013 | Heil et al. |
| 2013/0335611 A1* | 12/2013 | Roman ................ G06Q 99/00 348/333.01 |
| 2015/0120409 A1* | 4/2015 | Bhattacharya ..... G06Q 30/0206 705/14.13 |

FOREIGN PATENT DOCUMENTS

| | | |
|---|---|---|
| JP | H11-296750 | 10/1999 |
| JP | 2011-056718 | 3/2011 |
| JP | 2011-173290 | 9/2011 |

OTHER PUBLICATIONS

Supplirnentary European Search Report dated Oct. 28, 2016 for Application No. EP 14 77 2932.

* cited by examiner

METHOD, SYSTEM, AND APPARATUS FOR PROVIDING PRODUCT DATA

BACKGROUND OF THE INVENTION

Retailers, merchandisers and the like spend valuable time planning effective price markdowns, changing the price of a consumer good from one price to a lower price. However, these price markdown plans usually fail because the employees are not able to complete the markdowns in a complete, accurate, or timely manner. The markdown price is often written manually on the tag, which takes extra time and looks unprofessional and can confuse the consumer as to what the actual price of the item may be. Additionally, there is no feedback to let the manager know which of the markdowns have been completed and if all of the markdowns were done properly.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

A handheld printer and a method for discounting retail items is described. The handheld printer may communicate with a smart device, such as a smart phone, personal data assistant or similar device. An employee or user may select an item to be discounted and may scan a tag using the handheld printer. The handheld printer may then communicate with the smart device via Bluetooth, carrier networks—or other suitable communication means, LANs, and WANs to obtain information about the item or related products. The smart device may have a handheld software application associated with it as well linking the handheld unit to the smart device. The handheld software application may look up the markdown information in memory or through a wireless network connection. The host may then send the markdown label information to the handheld printer. The label information may include the number of units to be marked down, a description of the units to be labeled, the change in price of the units, the time to complete the markdown operation and any other pertinent information that the retailer or merchandiser may provide. The handheld printer may then print the corrected or desired price tag and the tag may be applied to the desired location.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

In the accompanying drawings, which are incorporated in and constitute a part of this specification, embodiments of the invention are illustrated which, together with a general description of the invention given above and the detailed description given below, serve to exemplify the principles of this invention, wherein:

FIG. 5 is an exemplary diagram showing shared information between the handheld printer and handheld device application; and.

DETAILED DESCRIPTION OF THE DRAWINGS

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many embodiments are described in terms of sequences of actions to be performed by, for example, elements of a computing device. It may be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
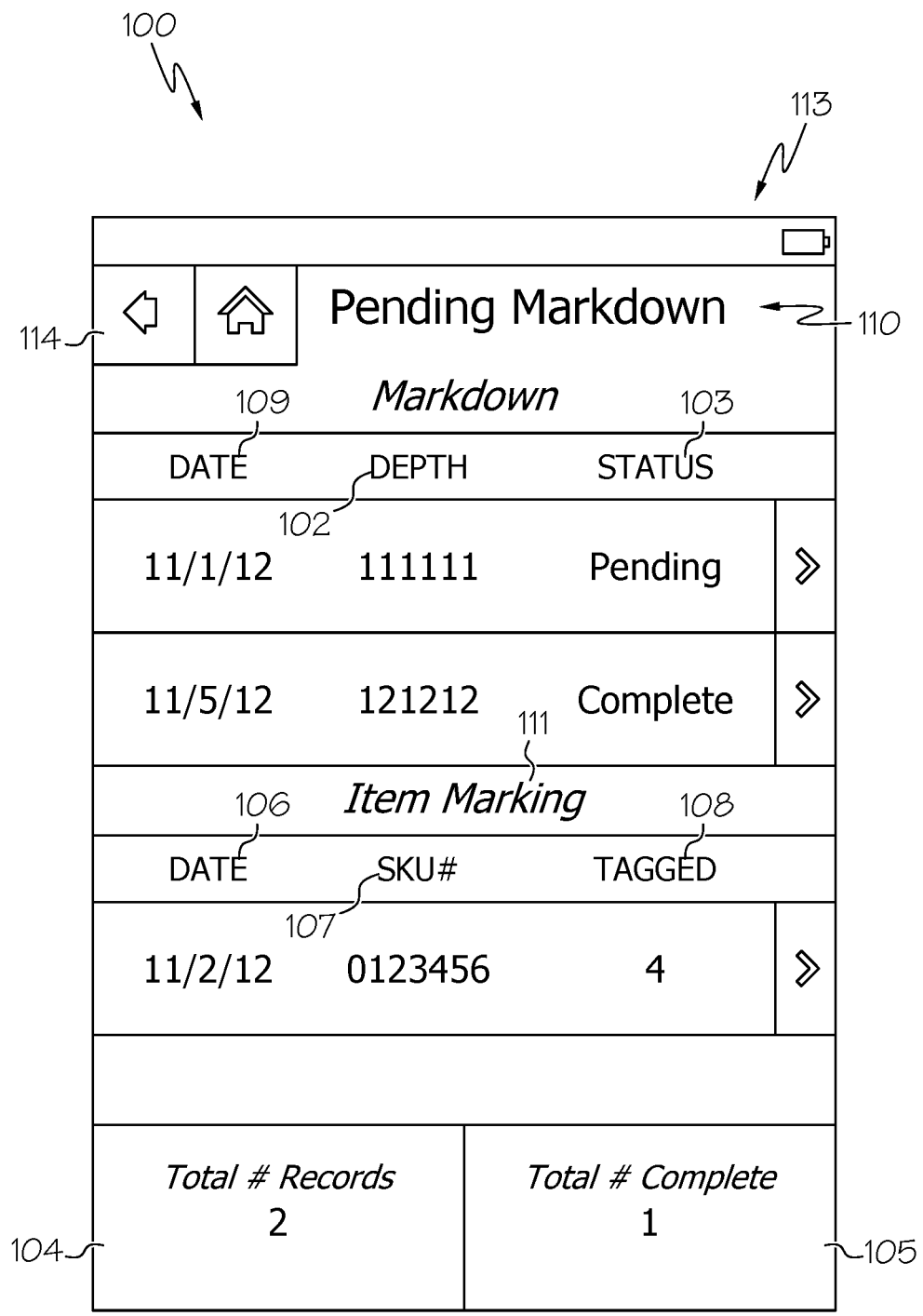
FIG. 1 is an exemplary diagram showing a computer readable medium of a handheld device application.

An exemplary method and apparatus for data entry utilizing mobile devices and applications is set further in U.S. Pat. No. 7,756,829. The disclosure of which is incorporated by reference hereto. FIG. 1 may provide an exemplary view of a handheld device application. Here, the application may have an interface 100 shown on a display. Further, in the exemplary embodiment, the handheld device application may be used on a mobile or smart device 112. Alternatively, the handheld device application may be used on any other suitable wireless communication device(s). The interface 100 may list a pending markdown 110. The interface 100 may also show a markdown date 109, e.g. the date by which the markdown must be completed. For example, the markdown may be done in connection with a sale or other promotion or as part of a merchandise clearance activity such as when apparel fashion changes seasons. The interface 100 may further show a department 102 or division of a store that may be associated with the markdown. The interface 100 may also show a status 103 of the item needing to be marked down as well as the number of items that need to undergo the markdown as well as a description or image of the items that are subject to the markdown.

Still referring to exemplary FIG. 1, the interface 100 may also list an item undergoing the marking 111. The interface 100 may show a date of the item marking 106. The item marking date 106 may be associated with a set of unique identification codes 107 used to provide specification information about the item marking. The unique identification codes 107 may show a number of items tagged 108 or to be tagged. Also, the interface 100 may also show a number of total records 104. The interface 100 may, in some further exemplary embodiments, show a total number of completed markdowns 105. Additionally, the interface 100 may further have a power indicator 113 that can provide an indication of battery power or other power used to operate a device on which interface 100 may be operating. The interface 100 may also have any of a variety of controls or buttons that provide any of a variety of controls, for example an option to return to the home server or previous server 114.

Still referring to exemplary FIG. 1, the handheld device application may be print enabled in which the application is on a handheld device such that the handheld device serves as a printer. In another embodiment the application may be on a handheld device such a smart device that is not a printer and communicates via a wireless connection to a printer that is independent from the handheld device. This connection may be made in any desired manner, for example a wired or various wireless connections (Bluetooth/wireless Ethernet or other suitable connection. The handheld device application may have any of a variety of specific features to support item marking, markdowns, and bulk markdowns, amongst others, as desired. For item marking, in one example, a positive lookup result may give a specific label design (such as price alone, however it should be understood that other indicia may be provided such as brand, size or the like). For markdowns, in another example, associates may be guided by a hierarchy (date/department, then items). Then a positive lockup result may print a different label design that may include the original price, the discount price, and the savings amount. For bulk markdowns, a markdown label design may print which is then simply placed over the previous label to conceal the prior price. With bulk markdowns, there may not be a function that guides the associate to the markdown and instead the associate just goes through an entire section of inventory.

Figure 2:
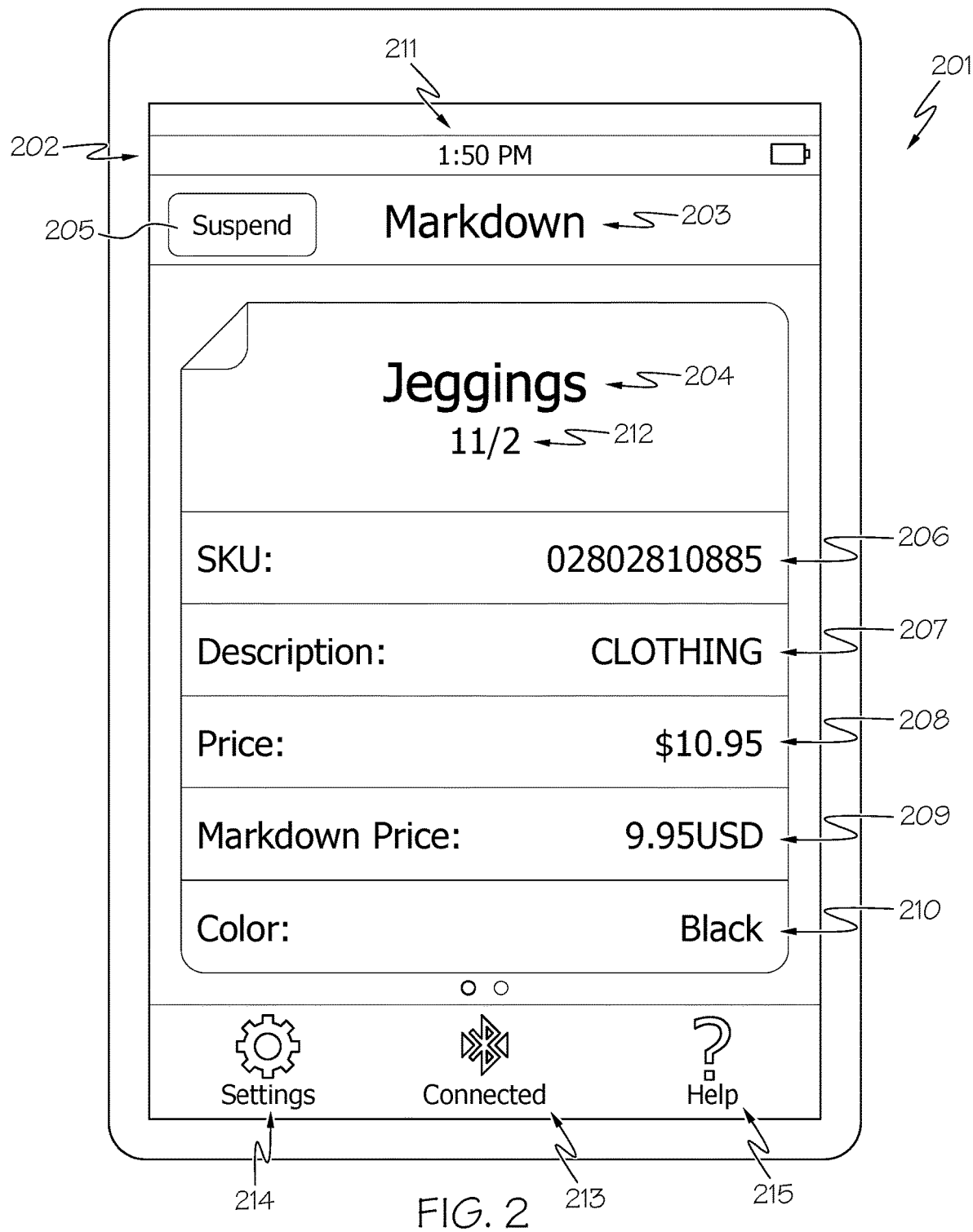
FIG. 2 is an exemplary diagram showing a computer readable medium of the handheld device application.

FIG. 2 is an exemplary diagram showing an interface of the handheld device application described herein. In one embodiment, the handheld device application may be used on a handheld tablet 202, mobile computing device, or the like. The application may also be utilized on a handheld printer. In an additional embodiment, the application may be on a smart device that also serves as a printer. Alternatively, the handheld device application may be used on any other device as would be understood by a person of ordinary skill in the art. Application 201 may contain the current time 211. Application 201 may also contain a markdown section 203. The markdown section 203 may also contain the item's label 204. Application 201 may also contain the quantity expected to be scanned versus the quantity or count of items which is actually scanned 212. Application 201 may also contain a unique identification code 206 for the item, which may be obtained for example by a UPC or EPC code by reading a bar code or RFID device. Application 201 may also have an option to suspend work 205. Application 201 may also contain a description of a markdown item 207. Application 201 may also contain an original price of the markdown item 208. Application 201 may also contain the markdown price of the item 209. Application 201 may also contain a color of the item 210. Application 201 may also have a help option 215. Application 210 may also have a connection option 213. Application 201 may also have a settings option 214. It may be appreciated that, in further exemplary embodiments, application 201 may have still other controls and capabilities not shown herein.

Figure 3:
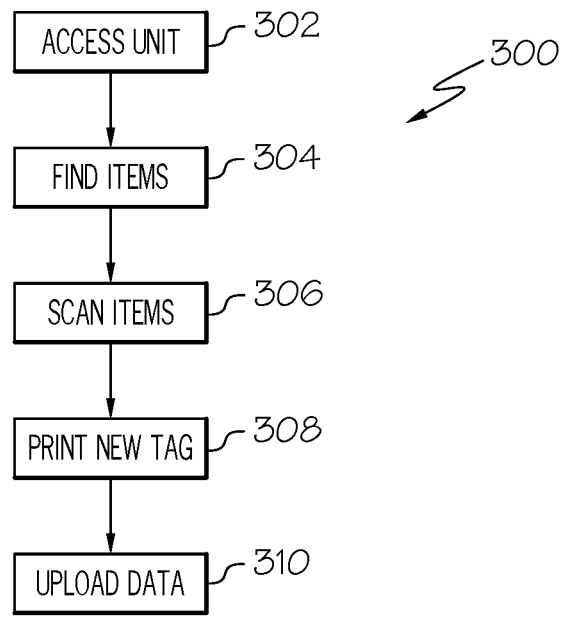
FIG. 3 is an exemplary flow chart showing a method of marking.

Exemplary FIG. 3 may show a method of marking an item. In one embodiment, a process 300 may be used for making down items using a handheld device such as a smart device in which the handheld device has an application on it. First, in 302, a user may pick up the handheld device and log into the application on the handheld device in order to get series of tasks that have been assigned to a particular store associate or employee for the particular work shift. Second, in 304, the user may take the handheld printer and a smart device and may find items that may be on sale or subject to another promotion. Third, in 306, user may then scan the tag (barcode, RFID device) of the sale item. Fourth, in 308, the scanner may print out a new tag, which can be applied to the desired product. Fifth, in 310, the system may report these actions to a central location that allows for review and organization of the taken actions.

Figure 4:
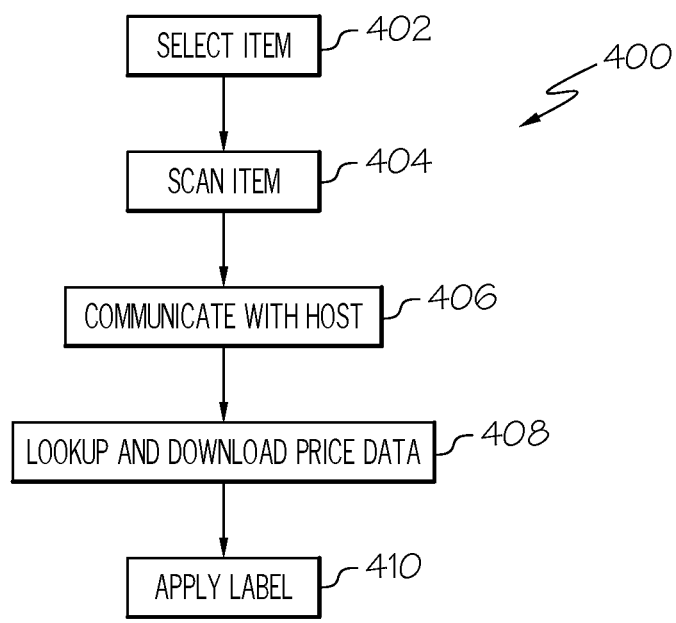
FIG. 4 is an exemplary flow chart showing a method of sharing information between the handheld printer and handheld device application.

FIG. 4 is an exemplary flow diagram showing a method of sharing information between a handheld printer and a handheld device application. Flowchart 400 can show that the handheld device application may be used globally or in any desired or local environment such as a particular retail store or across a distribution network or retail chain. The handheld device application may also be used on any handheld device as would be understood by a person of ordinary skill in the art, as desired. First, in 402, the store clerk may select an item that may be desired to be marked down. Second, in 404, the store clerk may scan the tag using a handheld device, such as a handheld printer and scanner. Third, in 406, the handheld device may communicate with a host, such as a server, through any desired networks, LANs, and WANs. Fourth, in 408, an application on the device may look up the markdown price in a memory or through a wireless connection and the host may then communicate the markdown label information to the handheld printer. Fifth, in 410, the store clerk may apply the markdown label to the tag of the item.

Figure 5:
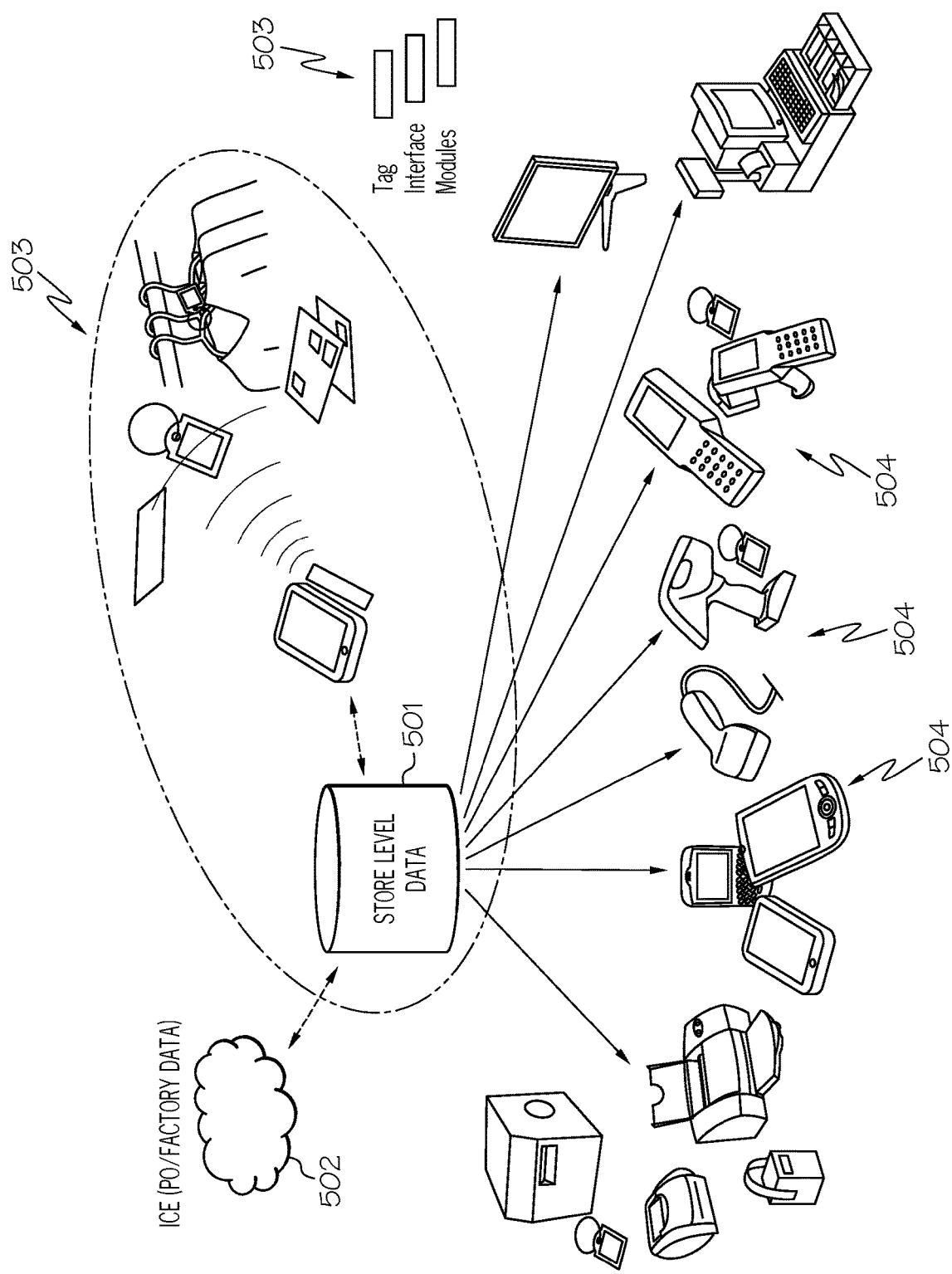

FIG. 5 is an exemplary diagram of a method and system of sharing information between the handheld printer and handheld device application. Various product data, such as ICE®, InfoChain Express®—available from Avery Dennison Retail Information Services, LLC of Westborough, Mass. (PO/Factory data) 502 may be communicated to the store 501 via any desired network or communication methodology. The store 501 may also communicate with any of a variety of items in a store, for example tags (including RFID tags and bar coded labels), tags associated with clothing, tag interface modules, credit cards, smart devices, scanners and the like 503. The store 501 may then communicate and/or share the information with recipient devices 504. These other devices may include, but are not limited to, printers, wireless printers, smart phones, smart devices, scanners, computers, cash registers, and monitors, as desired. Alternatively, the store 501 may send information to any other devices as may be understood by a person of ordinary skill in the art. Thus, in exemplary FIG. 5, the store 501 may be able to receive remote data 502 regarding products and share it or provide it in-store items using a variety of items. This information is then relayed to consumers as they shop or purchase items.

Figure 6:
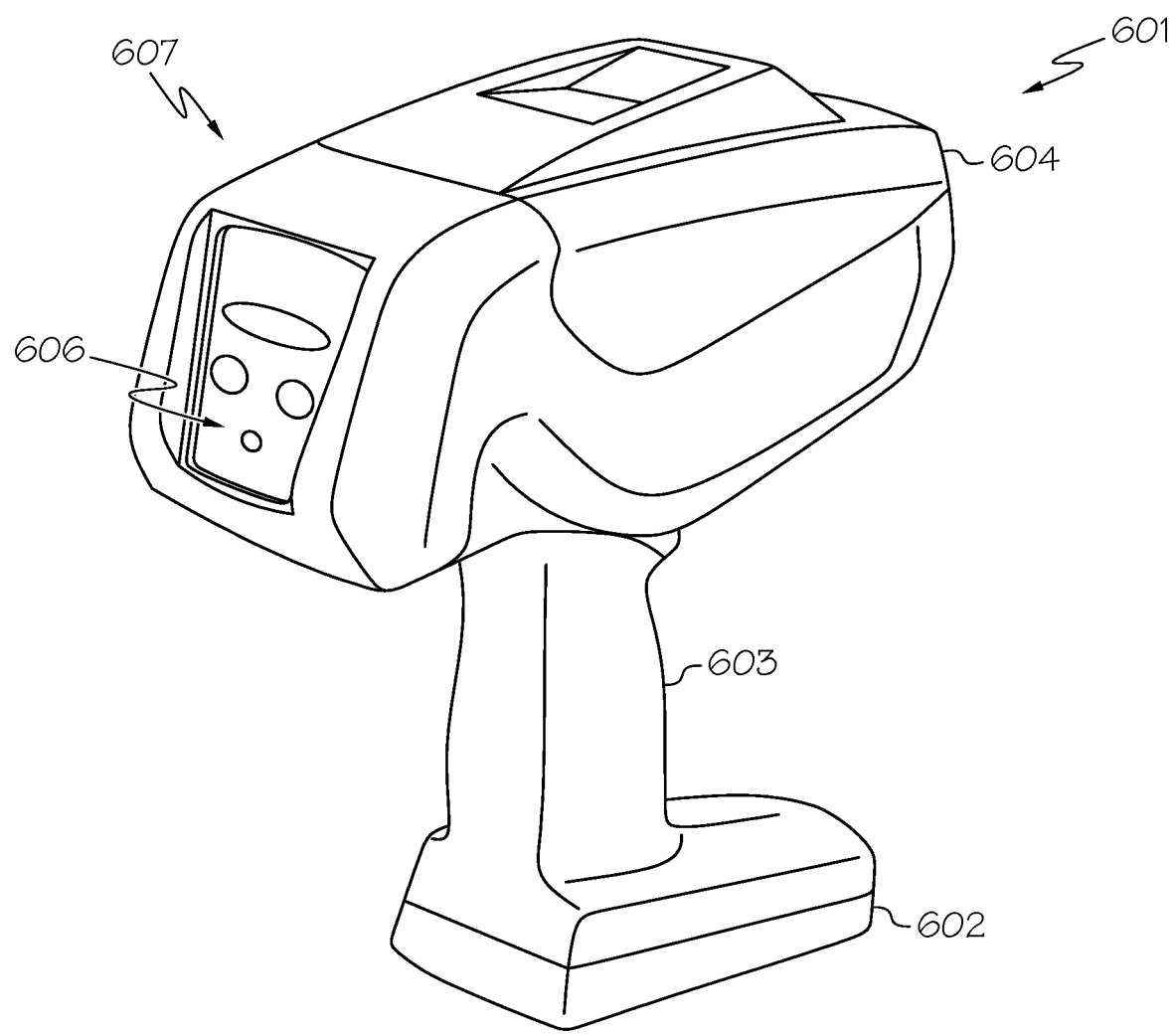
FIG. 6 is an exemplary embodiment of a handheld printer.

Exemplary FIG. 6 is a diagram of a handheld device, such as a handheld printer. The handheld device 601 may be used with a smart device, or may include smart device functionality to receive and communicate or otherwise provide a variety of data. An exemplary handheld device is marketed under the trademark PATHFINDER® and is available from Avery Dennison Retail Information Services, LLC of Westborough, Mass. Such data can include, but is not limited to pricing rework data, WIP tracking data, cross docking data, case/item labeling data, part identification data, and license plate applications. The handheld device 601 may be interchangeable across multiple smart device platforms including, but not limited to iOS (Apple), Windows CE/Mobile and Android compatible platforms. The handheld device 601 may also be compatible with other platforms as would be understood by a person of ordinary skill in the art. The handheld device 601 may be about 27.2 ounces, although different sizes and dimensions may be envisioned which allow it to be easily manipulated and/or carried.

Still referring to exemplary FIG. 6, a handheld device 601 may have a base portion 602, which may include power capabilities, such as a battery or other connectivity. The base 602 may be connected to the core 603, which may serve as a handle for the user to grasp. The core 603 may also be connected to a crown 607. The crown 607 may contain a control panel 606. The control panel 606 may contain any number of switches as well as a user interface, such as keypad or touch screen. Control panel 606 may therefore act to provide basic input capabilities as well as to possibly display any of a variety of information. The crown 607 may also contain a scanning portion 604 that may read the items and then communicate with other devices such as a printer.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for providing product markdown data, comprising:
   a mobile device having an interface with a display,
   the display including product markdown information and an image of a product provided by a host;
   an application on the device where a user logs in and views a series of tasks, wherein the product markdown information is looked up by the application in memory and/or through a wireless network connection;
   a scanner for reading product information associated with a particular product, the scanner connected to the mobile device, the scanner further having a printer to print a label;
   wherein the scanner is print enabled to print the label with the product markdown information received from the mobile device.

2. The system of claim 1, wherein the interface shows a date.

3. The system of claim 2, wherein the date is associated with a set of unique identification codes.

4. The system of claim 1, wherein the interface shows a number of records.

5. The system of claim 1, wherein the interface shows a total number of selected markdowns.

6. The system of claim 1, wherein the interface has a power indicator.

7. The system of claim 1, further comprising information provided on the display showing a quantity of product expected to be marked down versus an amount of product which has been scanned.

8. The system of claim 1, further comprising a description of a markdown item.

9. The system of claim 1, further comprising a unique identification code for the particular product that is obtained by reading a RFID device with the scanner.

10. The system of claim 1, where the markdown information includes a date by which a product markdown must be completed.

11. The system of claim 1, where the mobile device is one of a smart phone, a personal data assistant, a handheld tablet, or a mobile computing device.

12. A method of providing markdown information for a consumer product good, comprising the steps of:
   providing a handheld device having a handheld device application and the application has an interface;
   providing an item with a tag;
   logging into the application on the handheld device and viewing a series of tasks;
   scanning the tag;
   retrieving information related to the item based on information scanned from the tag;
   obtaining the markdown information from a mobile device connected to a network, the mobile device is separate from the handheld device;
   printing a new label based on the markdown information, wherein the new label has a different label design depending on a process being performed;
   placing the new label on the tag to reference new pricing information; and
   reporting actions to a central location that allows for review and organization of taken actions.

13. The method of claim 12, wherein the handheld device includes a printer.

14. The method of claim 12, further comprising obtaining a series of tasks assigned to a particular store associate or employee for a particular work shift.

15. A method of sharing information between a handheld printer and handheld device application, comprising the steps of:
   providing a handheld device having a handheld device application having an interface;
   providing an item having a tag;
   retrieving information relating to the item from a network;
   scanning the tag associated with the item with the handheld device;
   communicating with a host through the network;

looking up the information for the item;
producing a label with the information based on the step of looking up information for the item, wherein the label has a different label design depending on a process being performed and wherein the information is markdown information;
suspending previous steps at a user's discretion; and
reporting actions to a central location that allows for review and organization of the taken actions.

16. The method of claim 15, wherein the handheld device includes a printer.

17. The method of claim 15 further comprising placing the label on the item.

18. The method of claim 15 wherein the handheld device comprises:
a base portion;
a core which serves as a handle, the core is connected to a crown having a control panel; and
wherein the handheld device includes a printer and user interface.

19. The method of claim 15, where the tag comprises an RFID device.

20. The method of claim 19, further comprising obtaining a unique identification code for the item by reading the RFID device.

* * * * *